Jan. 23, 1973 H. THOMANN 3,713,036

SURFACE WAVE DEVICE HAVING ALTERNATING REMANENT POLARIZATION
BETWEEN INTERDIGITAL ELECTRODES, SPACED A
SURFACE WAVELENGTH APART
Filed April 26, 1971

INVENTOR
*Helmut Thomann*

BY *Hill, Sherman, Meroni, Gross & Simpson* ATTYS.

United States Patent Office 3,713,036
Patented Jan. 23, 1973

3,713,036

SURFACE WAVE DEVICE HAVING ALTERNATING REMANENT POLARIZATION BETWEEN INTERDIGITAL ELECTRODES, SPACED A SURFACE WAVELENGTH APART

Helmut Thomann, Munich, Germany, assignor to Siemens Aktiengesellschaft, Berlin and Munich, Germany Filed Apr. 26, 1971, Ser. No. 137,231
Claims priority, application Germany, Apr. 29, 1970, P 20 21 090.6
Int. Cl. H03h 7/30; H01v 7/00
U.S. Cl. 333—30 R 4 Claims

ABSTRACT OF THE DISCLOSURE

A surface-wave acoustic device characterized by input and output transducers disposed on a surface of a piezo-electric ceramic substrate. Each of the transducers is of an interdigital type having a pair of comb-like electrodes each of which has prong or finger-like electrodes arranged with the fingers or prongs of one electrode disposed between the prongs or fingers of the other electrodes. The device is produced by applying a polarizing field to the electrodes to cause the direction of remanent polarization to extend from prong to prong of the interengaged electrodes of each transducer. The distance of the prongs of the comb-like electrodes from each other is equal to one wave length of the acoustic surface wave.

BACKGROUND OF THE INVENTION

Field of the invention

The present invention is directed to a surface-wave acoustic device in which interdigital transducers are disposed on a surface of a piezo-electric ceramic substrate which is polarized with the direction of polarization extending from electrode prong to electrode prong.

Prior art

Electro-acoustical devices, such as prior art filters and delay lines which utilize the surface wave principle and a polarized piezo-electric substrate, usually had the substrate polarized in the direction of the thickness of the substrate or a direction perpendicular to the surface of the substrate. Such a polarization has proven very advantageous in electro-acoustical devices utilizing substrate materials such as quartz which has natural piezo-electric properties. However, other materials which can be made piezo-electrical by the application of electrical fields are common. These are mainly substances made of lead-zirconate-titanate (PZT) ceramics which exhibit low coupling factors for surface waves; however, they have a high basic dampening for the filter which is caused by this direction of polarization and is a drawback in the use of this ceramic material in the prior art filters utilizing the surface wave principles.

SUMMARY OF THE INVENTION

The present invention is directed to a surface-wave acoustic device which device utilizes surface wave principles and has a low basic dampening and a high coupling factor and which device utilizes a piezo-electric ceramic substrate which has deposited on its surface thereof input and output transducers which are interdigital transducers having comb-like electrodes with interengaging prongs or finger-like portions. To obtain the desired coupling and dampening features, the piezo-electric ceramic substrate is polarized by applying the polarizing voltages through the comb-like electrodes of the transducers so that the direction of remanent polarization extends from prong to prong of the electrodes.

Accordingly, an object of the present invention is to provide an electro-acoustical device in which the remanent polarization of the ceramic substrate extends from prong to prong of the electrodes of the transducers disposed on the surface of the substrate.

Another object of the present invention is to provide a surface-wave acoustic device and a method of making the device having a high coupling factor and a low dampening factor.

A still further object of the present invention is to provide a surface-wave acoustic device utilizing a lead-zirconate-titanate ceramic as a substrate which device has a high coupling factor and a low dampening factor.

Other objects, features and advantages of this invention will be readily apparent from the following description of the preferred embodiment thereof taken in conjunction with the accompanying drawings although variations and modifications may be effected without departing from the spirit and scope of the novel concept of the disclosure.

DESCRIPTION OF THE PREFERRED EMBODIMENT

Figure 1:
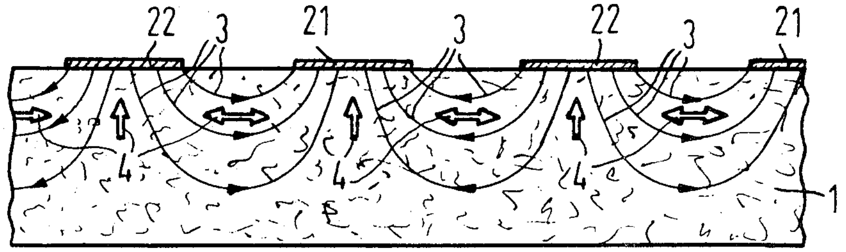
FIG. 1 is a partial, longitudinally extending cross section of a surface-wave acoustic device of the present invention.

The principles of the present invention are particularly useful when incorporated in a surface-wave acoustic device utilizing a piezo-electric substrate 1, a transducer having a pair of interdigital electrodes which are comb-type electrodes with prongs or fingers 21 and 22 respectively. The fingers of the two electrodes are interengaged between each other so that in the cross section as illustrated in FIG. 1, the fingers 21 of one electrode are disposed between the fingers 22 of the other electrode of the transducer. Spaced from the transducer formed by the electrodes, fingers 21 and 22 and usually at another end of the substrate 1 is a second transducer having a similar arrangement of fingers.

To polarize the ceramic substrate 1 which is preferably a lead-zirconate-titanate ceramic, a negative pole of the polarizing voltage is applied to the electrodes 21 and the positive pole to the electrodes 22 which results in the polarizing field extending between the electrodes 21 and 22 to directionalize the polarization as indicated by the lines 3. Thus the direction of remanent polarization follows a curve path extending between the probes 21 and 22 respectively.

When the device is used, the high frequency field created by the transducer to form the surface wave will be parallel or antiparallel to the remanent polarization of the substrate 1. For instance, when both the high frequency field and the remanent polarization are parallel to the surface of the substrate, the elastic stress occurs parallel to the surface and a deflection vertical to the surface is effected only by cross contraction. When the field and polarization stand vertical to the surface of the substrate, a deflection occurs directly vertical to the surface. Thus the forces which occur by the application of fields via the transducer cooperate in the right manner so that a surface wave of the Rayleigh type is produced. The elastic forces which occur are illustrated by the arrows 4 and are in both vertical and parallel directions to the surface of the substrate.

As mentioned above, the substrate is preferably a lead-zirconate-titanate ceramic and, depending on the application of the device, a hard or soft type of ceramic will be selected. Hard ceramics as opposed to soft ceramics have the advantage of a higher mechanical material quality while by using a substrate of soft ceramic the curve passage of the filter is particularly free from side resonances.

The surface-wave acoustic device of the present invention is preferably made in the following manner. A ceramic substrate preferably has one surface entirely metallized. Then the pattern of the electrode such as fingers 21 and 22 of each of the transducers is etched from the metallized surface using a photo etching method which involves coating the metallized surface with a photosensitive masking material, exposing the desired pattern for the electrode on the masking material, and removing the metallized surface in the unexposed areas by appropriate etching techniques. After etching the metallized surface of the substrate to form the electrodes of the transducers the ceramic substrate is then polarized by applying the polarizing voltage to the probes or finger-like portions of each of the electrodes of the transducer.

The method of forming the device according to the above described method has many advantages including enabling an exact reproduction of the desired dimensions for the electrodes of the transducers. Secondly, the manufacturing techniques of forming the electrodes can be performed on the unpolarized substrate thus eliminating the problem of aligning the orientation of the electrodes with the particular polarization of the ceramic substrate. Furthermore, polarizing the substrate by using the electrodes, insures that the polarization is in the proper orientation with respect to the configuration of the electrodes of the transducer.

Figure 2:
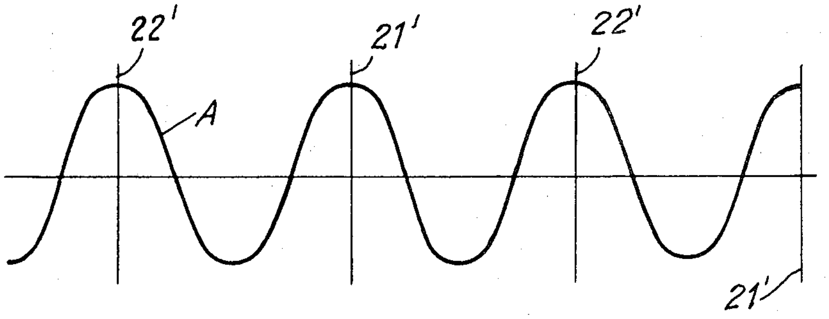
FIG. 2 is a diagrammatic illustration of the surface wave produced by the electroacoustical device of the present invention.

As mentioned above, the polarization of the substrate from electrode finger or probe to electrode finger probe results in lowering the basic dampening of the substrate and in addition thereto, the wave length of the surface wave which are excited by the transducer is of a resonance equal to a distance between each of the probes. This means that with the same resonant frequency, the distance of the prongs of the comb-like electrodes from each other is equal to one wave length of the surface wave versus a half a wave length in the prior art devices. In FIG. 2, a surface wave A produced by the tranducer having electrodes 21 and 22 is illustrated. As illustrated, lines 21' and 22' represent the center lines of the electrodes 21 and 22. The surface wave A has a wave length equal to the distance between the center lines 21' and 22'.

With a test sample, a coupling factor has been measured which is almost 50% higher than that of previously known common filter arrangements. This high coupling factor is due to the fact that remanent polarization and the exciting field almost coincide and thus the longitudinal material coupling factor comes into effect. In addition, the piezoelectric coupling with the exitation principle according to this invention has a geometrically correct effect in the sense of the production of surface waves at each point on the substrate.

Furthermore, a high quality value could be determined with the filters and delay lines designed according to this invention. The material quality which is calculated herefrom is twice as high as that of the prior art devices and higher than the vibrating quality of the material in the kilohertz (kHz.) range. In actual test, a resonance frequency of about 5 mHz. was obtained in the embodiment tested.

Although minor modifications might be suggested by those versed in the art it should be understood that I wish to employ within the scope of the patent warranted hereon all such modifications as reasonably and properly come within the scope of my contribution to the art.

I claim as my invention:

1. In a surface-wave acoustic device such as a filter or delay line having a polarized piezo-electric ceramic substrate with an input and output transducer provided on a surface thereof, each of said transducers being an interdigital transducer with comb-like electrodes arranged with interengaging prongs, the improvement comprising the direction of remanent polarization of the ceramic substrate extending from electrode prong to electrode prong of each transducer and the distance of the centers of said electrode prongs from each other being equal to one wave length of the acoustic surface wave.

2. In an electro-acoustical device according to claim 1, wherein the ceramic substrate is a lead-zirconate-titanate ceramic (PZT).

3. In an electro-acoustical device according to claim 2, wherein the substrate is a soft ceramic.

4. In an electro-acoustical device according to claim 2, wherein the ceramic substrate is a hard ceramic.

References Cited

UNITED STATES PATENTS

| | | | |
|---|---|---|---|
| 3,621,482 | 11/1971 | Adler | 333—72 |
| 3,582,540 | 6/1971 | Adler | 178—5.4 |
| 3,609,558 | 9/1971 | Ise | 325—487 |
| 3,496,553 | 2/1970 | Freytag et al. | 340—173.2 |
| 3,071,841 | 1/1963 | Brussard | 29—25.35 |
| 3,446,974 | 5/1969 | Seiwatz | 333—72 |
| 2,540,412 | 2/1951 | Adler | 179—100.41 |
| 2,953,755 | 9/1960 | Mattiat | 333—72 |
| 3,343,105 | 9/1967 | Van der Pauw | 333—30 R |
| 3,360,749 | 12/1967 | Sittig | 333—30 R |
| 3,562,792 | 2/1971 | Berlincourt et al. | 333—72 |

HERMAN KARL SAALBACH, Primary Examiner

W. N. PUNTER, Assistant Examiner

U.S. Cl. X.R.

333—72; 310—9.8